United States Patent
Samodell

(10) Patent No.: US 6,570,129 B1
(45) Date of Patent: May 27, 2003

(54) PROTECTION DEVICE FOR DUAL STAGE POWER SUPPLY

(75) Inventor: Ralph M. Samodell, Willoughby Hills, OH (US)

(73) Assignee: Lincoln Global, Inc., Monterey Park, CA (US)

(*) Notice: Subject to any disclaimer, the term of this patent is extended or adjusted under 35 U.S.C. 154(b) by 2 days.

(21) Appl. No.: 10/039,556

(22) Filed: Jan. 8, 2002

(51) Int. Cl.[7] .................................................. B23K 9/10
(52) U.S. Cl. .................................................. 219/130.21
(58) Field of Search ............... 219/130.21, 137 PS, 219/136, 130.31, 130.32, 130.33, 130.5, 130.51

(56) References Cited

U.S. PATENT DOCUMENTS

| | | | | |
|---|---|---|---|---|
| 3,160,783 A | * | 12/1964 | Mulder | |
| 3,237,051 A | * | 2/1966 | Schober | 219/130.1 |
| 4,048,467 A | * | 9/1977 | Wertli et al. | 219/130.31 |
| 5,017,756 A | * | 5/1991 | Gilliland | 219/130.32 |
| 2002/0038795 A1 | * | 4/2002 | Katooka et al. | 219/130.21 |

* cited by examiner

Primary Examiner—Clifford C. Shaw
(74) Attorney, Agent, or Firm—Fay, Sharpe, Fagan, Minnich & McKee

(57) ABSTRACT

A protection device for use on a dual stage power supply for passing a current from first and second paths in unison across an electrode and a workpiece of an electric arc welder. The device includes a resistor connected between generally identical voltage points in the first and second paths, whereby current flows through the resistor based upon the difference in the voltage of the points, a thermostat mounted adjacent the resistor with the thermostat having a known temperature at which the thermostat is tripped and a circuit to provide a signal when said thermostat is tripped to the signal can shut down the power supply until it is reset.

28 Claims, 2 Drawing Sheets

PROTECTION DEVICE FOR DUAL STAGE POWER SUPPLY

The present invention relates to the art of electric arc welding and more particularly to a protection device for a dual stage power supply used in electric arc welding.

BACKGROUND OF INVENTION

In electric arc welding and plasma cutting (collectively referred to as "electric arc welding") dual stage power supplies, such as a dual chopper, are often used to divide the power requirements for the welding operation into two parallel stages. In this manner, a chopper type power supply can provide twice as much electric energy to the welding or plasma cutting operation. The advantage of these parallel choppers are low cost and easy feedback control. However, dual choppers and other dual stage power supplies sometimes create a critical imbalance of the two current paths sharing the output current. The typical causes of this unbalance is poor connections, loss of the switching gate drive in one of the stages, or a failed stage. During such extreme imbalance conditions, one stage of a dual chopper shuts down. The other stage attempts to carry the full load current. This imbalance condition causes a rapid overheating and sometimes destruction of the operating stage. There have been attempts to use electronic monitoring on the dual stages to detect excessive currents through the switching devices. These electronic monitoring devices require appropriate noise immunity and inadvertent nuisance activation. Consequently, electronic monitoring dual choppers and other dual stage power sharing power supplies are quite complex and costly. In the past, a thermostat switch has been mounted adjacent the switching devices to monitor the heat of the switching devices for detecting overheating caused by imbalance. However, it has been found that the thermostat can not respond quickly enough under critical imbalance conditions to thermally protect the switching devices of the power supply. In addition, the thermostat is in the hot ambient area of the power supply. Consequently, the thermostats must be set with a trip temperature above the operating ambient range of the power supply. The ambient temperature rating is −20° C. to +50° C. For instance, the switching devices of a power supply will typically operate at about 50°–60° C. rise above ambient temperatures. The trip temperature for an imbalance should be in the range of about 70–85° C. In this manner, the thermostat will not trip at ambient temperatures, but will trip rapidly at imbalance temperatures. This creates an impossible divergence of operating parameters for the thermostat. Consequently, there is a need for a protection device for dual choppers and other dual stage power supplies which share power for electric arc welding and/or plasma cutting that is insensitive to ambient conditions and rapidly responsive to imbalance of the two stages.

THE PRESENT INVENTION

The present invention relates to a detection device for a dual chopper or other dual stage power supplies that includes first and second paths for directing current in unison across an electrode and workpiece of an electric arc welder or plasma cutter. This device includes a resistor connected between generally identical voltage points in the first and second paths of the parallel power supply stages. Consequently, current flows through the resistor based upon the difference in voltage of these identical points. A thermostat mounted adjacent the resistor has a known temperature at which the thermostat will trip to the overheat state. By using the resistor for heating the thermostat, the thermostat itself need not measure the relatively lower temperature excursions of the switches or other components of the parallel power supply stages. Thus, by merely adding a resistance that heats up rapidly between two substantially identical voltage points on the parallel power supply paths, the temperature of the resistor increases rapidly with critical imbalances and rapidly trips the thermostat to either provide a warning signal, deactivate the power supply or perform both of these functions.

In practice, the resistor is connected between the input of a split choke having a common output for directing the two currents from the power supply stage to the electrode and workpiece of the welding operation. By using the inputs of the split choke, a very distinct and positive point of voltage on both stages is obtained. Thus, typical operating voltage differences between the two ends of the appropriately selected power resistor will not cause the thermostat to trip in the highest operating ambient temperature, but voltage differences due to critical imbalance conditions causes rapid temperature increase and fast trip of the associated thermostat. The thermostat trips when there is imbalance of the stages before the switches actually increase to greater than their rated operating temperature. It has been found that in a complete imbalance with one stage inactive, the IGBT switches must be deactivated at a case temperature less than 125° C. With the imbalance protection device of the present invention, the thermostat trips in a maximum ambient temperature of 50° C. before the rated IGBT switches case temperature is reached. Thus, the protection device switches within a short period of time and before the actual switch of the operating stage of the power supply is overheated. The protection of the present invention trips before the IGBTs case temperature rise exceeds 75° C., even when the operating ambient temperature is at the maximum 50° C. It has been found that the differential voltage at the input of the split choke is no more than about 0.7 volts during normal balance operation. In extreme imbalance of the power supplies, the voltage difference at the input of the split choke is at least about 2.0 volts. Consequently, there is about a 8:1 wattage increase for heating the detect or resistor for imbalance conditions. In the preferred embodiment, the resistor is two parallel small, high temperature silicon coated one watt wire wound resistors fastened with tight contact to opposite sides of the metal thermostat body. This imbalance detector assembly or unit is then potted into a tube in order to secure the thermal contact between the resistors and the thermostat plate. This potting isolates the assembly from the machine cooling air and provides for insulated mounting and connection with the chopper power supply. The resistor and thermostat unit is mounted on a long extension to have the potted unit spaced from the hot area of the power supply. The thermostat known trip temperature is selected so that the thermostat will not trip when the power supply is operated at 50° C. ambient temperature plus a 15–20° C. allowance for internal location rise over ambient and normal voltage difference heating. Thus, the thermostat adjacent the resistor will not trip during normal operations of the dual chopper. This feature is enhanced by the isolation and spacing element of the assembled resistor and thermostat unit. Further, the increase temperature of the resistor during normal balanced operation will not trip the thermostat. The thermostat reset temperature needs to be above the rated ambient temperature of the machine. Thus, a thermostat in the preferred embodiment of the present invention is provided with a trip temperature in the range of 70° C.–85° C.

Preferably the trip temperature is 80° C. The reset of the thermostat is 55° C. which is still above the maximum operating ambient temperature of the power supply. This setting of the thermostat minimizes the required temperature rise to trip the thermostat and avoids nuisance tripping at a balanced temperature approaching 70° C. The value of the one watt paralleled resistors was selected to be within its maximum short time overload rating at extreme imbalance. This allows maximum heating rate to the trip temperature of the thermostat. However, when operated at lower voltage imbalance there is a minimum preheating of the thermostat. To accomplish this objective, the two parallel resistors are each 1.0 ohm with a one watt rating. All of these characteristics of the trip and the resistance associated with the thermostat for tripping the thermostat are within skill of the art. The basic concept is the use of a resistor for rapidly heating a thermostat with a known trip temperature so that as soon as there is a critical imbalance, the resistor temperature rapidly increases and trips the thermostat. This is a substantial advantage over merely measuring the temperature of each of the switches in the two parallel stages of the power supply with the further complicated associated with such direct switch temperature measurements when the switches are made up of several matched parallel IGBT packages in a common module.

The primary object of the present invention is the provision of a protection device for a dual stage power supply, such as used in electric arc welding and plasma cutting, which protection device will trip to create a signal quickly upon sensing an imbalance, yet be immune to nuisance thermal or current transient shutdowns.

Another object of the present invention is the provision of a protection device, as defined above, which protection device involves the use of a resistor between generally identical points on the paralleled power supply stages so that with any pre-fault thermal equilibrium condition the temperature of the resistor quickly rises upon a critical imbalance between the two stages to the thermostat trip point faster than the switching device rise to its destructive thermal limit.

Yet another object of the present invention is the provision of a protection device, as defined above, which protection device is easy to manufacture, can be used, or retrofilled on existing power supplies, is positive in operation and not expensive.

Still a further object of the invention is the provision of a protection device, as defined above, which protection device has a potted assembly that can be remotely spaced from the hot area of the power supply.

These and other objects and advantages will become apparent from the following description taken together with the accompanying drawings.

PREFERRED EMBODIMENT

Figure 1:
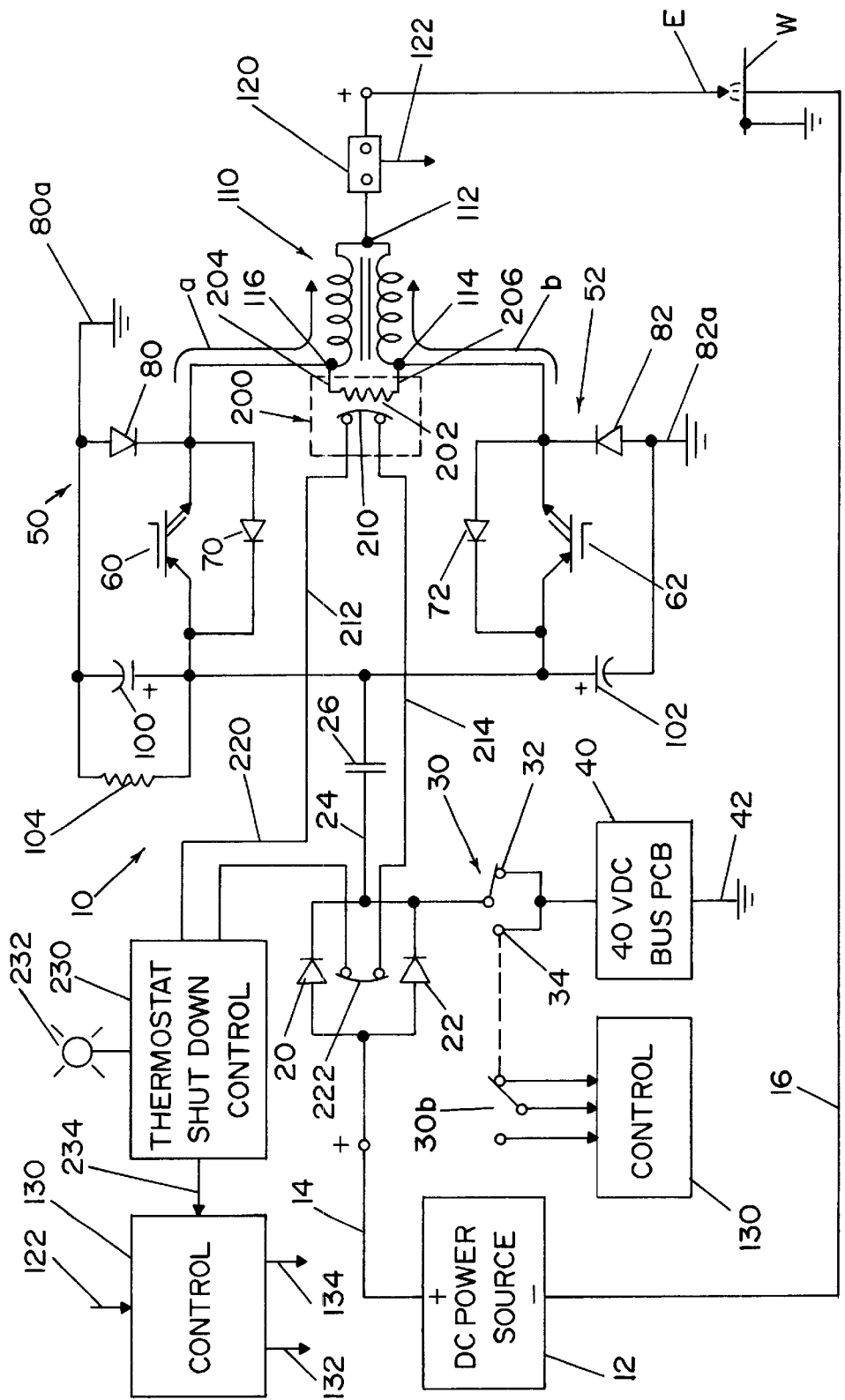
FIG. 1 is a wiring diagram of a schematically illustrated dual chopper showing the preferred embodiment of the present invention; and, FIG. 2 is a pictorial side view of the protection device constructed in accordance with the present invention with potting illustrated by a surrounding line.

Referring now to the drawings, wherein the showings are for the purpose of illustrating a preferred embodiment of the invention and not for the purpose of limiting same, a dual stage chopper or power supply 10 is schematically illustrated as including a DC power source 12 with a positive lead 14 and a negative lead 16. Power supply 10 is a dual stage power supply for controlling a current through electrode E and workpiece W for electric arc welding or plasma cutting. The schematically illustrated power supply includes input diodes 20, 22 for a first positive lead 24 connected to the power supply by contactor 26. The contactor is selectively connected to activate the power supply with input filter capacitors 100, 102. Lead 24 is also directed to a center off DPDT switch 30 having a constant voltage on position or contact 32 and a constant current on position or contact 34 for activating the control power supply PCB 40 grounded at lead 42. The second pole 30b of switch 30 connects to control 130 to allow operation in either basic cv or cc mode. Power supply 10 includes parallel power supply stages 50, 52 controlled by switches 60, 62 illustrated as IGBT switches. Of course, several switches are connected in parallel to carry the high current of the two chopper stages 50, 52. Snubber diodes 70, 72 are connected across the switches, whereas freewheeling diodes 80, 82 combine with sections of split choke 110 to complete the chopper design illustrated schematically in FIG. 1. The diodes are grounded by leads 80a, 82a, respectively. A resistor 104 is in parallel with input capacitor 100, 102 for controlling the voltage on the capacitors when power is shut off. Chopper stages 50, 52 create two current paths illustrated by the arrow a and the arrow b. In the preferred embodiment, split choke 110 carries the two current paths to a single output 112 connected to electrode E. Choke 110, in accordance with standard practice, includes current inputs 114, 116. A current shunt 120 creates a current feedback signal in line 122 directed to the controller 130 for the power supply. The output of the controller includes switch gates 132, 134 for operating switches 60, 62 in accordance with standard technology for providing down chopper output power to inputs 114, 116 of choke 110. Protection device 200 is shown as a dashed line box in FIG. 1 and is shown pictorially in FIG. 2. Heating resistor 202, which in practice is in the form of two parallel 1.0 ohm resistors each having a 1.0 watt rating, is connected by leads 204, 206 with inputs 114, 116, respectively. Resistor 202 is mounted on thermostat 210 with input leads 212, 214. Thermostat 210 senses the temperature of resistor 202 to trip the thermostat in accordance with the parameters previously described.

Power supply 10 includes a standard thermostat circuit 220 having an input diode temperature sensing thermostat 222 for controlling detector 230 having an indicator light 232. In accordance with standard technology, when the temperature of the diodes 20, 22 reaches a preselected known level, thermostat 222 is tripped. This actuates a trip signal to illuminate light 232. The trip signal also appears on line 234 to shut down the power supply by way of controller 130. By tapping into normal thermostat circuit 220, protection device 200 is connected in series in this existing circuit. Consequently, when resistor 202 heats up to a temperature equal to or above the known trip temperature of thermostat 210, circuit 220 is broken to initiate light 232 and output a trip signal in line 234. This shuts down the power supply. By using resistor 202 with thermostat 210, the rapid increase in temperature of resistor 202 is caused by a stage imbalance. The resulting voltage difference between inputs 114, 116 give a high current flow in the resistor. Inputs 114, 116 are the identical, normally balanced voltage points in paths a, b that sense when one of the two dual chopper stages is not operating normally. When that occurs, the current feedback in line 122 is directed to controller 130. This causes the properly operating chopper stage to make up the total required current for the welding process between electrode E and workpiece W. When this occurs, the chopper stage is overworked and the switches, either switch 60 or switch 62, carries an overload of current and is heated to a temperature above its rated temperature. The rated temperature is generally below 125° C. for the fault condition of this embodiment. Consequently, resistor 202 trips thermostat 210 long before such increase in switch temperature occurs.

Figure 2:
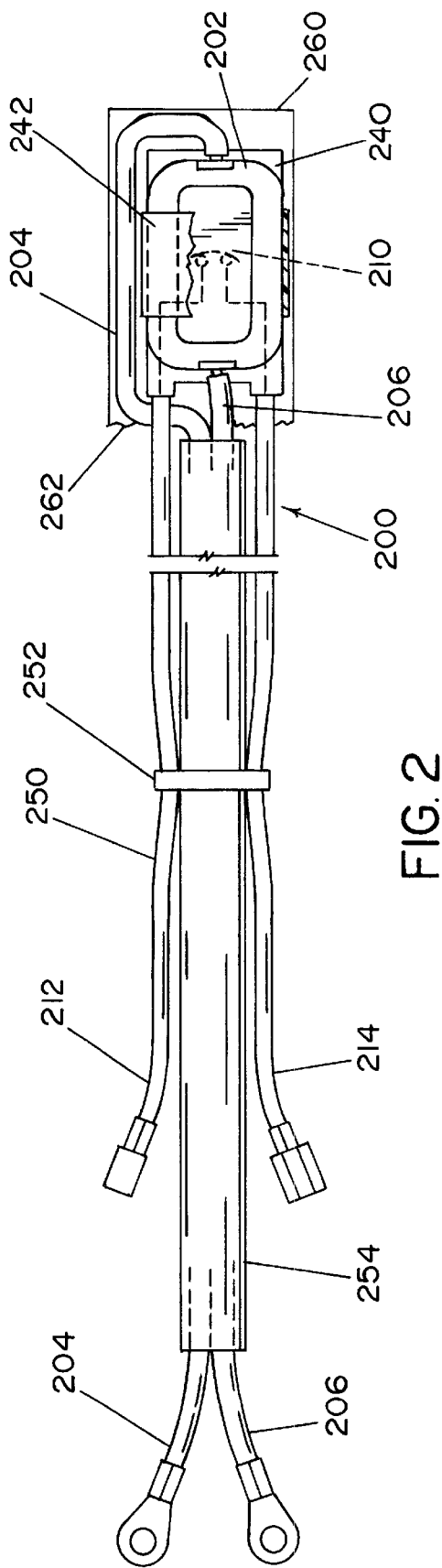

Protection device 200 is pictorially illustrated in FIG. 2 where the thermostat 210 is mounted on the thermostat base 240 against which resistor 202 is held by a surrounding tape 242. The protection device is on a lead extension 250 so that the resistor and thermostat assembly is spaced for location in a convenient and stable mounting location for connection to choke inputs 114, 116 and thermostat circuit 212, 214. A series of circular ties 252 holds leads 212, 214 onto a sleeving 254 surrounding leads 204, 206. The sleeve is to protect the leads from the hot area near the choke connecting points or inputs 114, 116. Other structures could be used for the protection device 200 to assure that it is mounted securely and protected from the heated area of choke 110. In practice, the assembled resistor and thermostat unit on outside end of extension 250 is potted for assembly security, insulation and environmental isolation. The potting is in a container 260 surrounding the resistor and thermostat assembly with the container filled with potting material 262. The resistor and thermostat operate as a unit and, preferably should not be exposed to ambient conditions which might alter the operational integrity.

In the preferred embodiment, the welder is to operate with an ambient temperature in the range of −20° C. to +50° C. Consequently, the thermostat must not trip at 50° C.+15–20° C. The trip temperature is preferably about 80° C., but in the range of 70° C.–85° C. At higher trip temperatures, the switches may reach a temperature to cause fault. With an 80° C. trip temperature and with the welder operating continuously at rated maximum output when there is an imbalance, the switches are at a 60° C. rise. This results in a maximum case temperature of about 110° C., the limit is 125° C. Thus, the thermostat must trip before a temperature rise of 75° C. This is accomplished by a trip temperature of generally 80° C. which shuts down the power supply before the switch temperature rise exceeds about 70° C. This gives a switch temperature of 120° C. when ambient temperature is 50° C.

In a situation where the welder is started up with an imbalance at an ambient temperature of 25° C., a rise of 55° C. will trip the thermostat. At this trip point, the switch case rise is to 105° C. If start up is at a maximum ambient temperature of 50° C., the trip point of 80° C. is reached where the switch rise is less than 55° C., giving a temperature of about 105° C. for the switches. This is within the rated temperature of the switch.

Having thus defined the invention, the following is claimed:

1. A protection device for use on a dual stage power supply for passing currents from first and second paths in unison across an electrode and a workpiece of an electric arc welder, said device includes a resistor connected between generally identical voltage points in said first and second paths, whereby current flows through said resistor based upon the difference in the voltage of said points, a thermostat mounted adjacent said resistor, said thermostat having a known temperature at which said thermostat is tripped into an overheat state, a circuit to provide a signal when said thermostat is tripped, and an indicator activated in response to said signal.

2. A protection device as defined in claim 1 wherein said device includes a circuit for disabling said power supply upon creation of said signal.

3. A protection device as defined in claim 2 wherein said power supply has a split choke with a current output and two parallel coil sections with first and second current inputs in said first and second paths, respectively, said current inputs of said split choke being said generally identical points.

4. A protection device as defined in claim 3 wherein said parallel coil sections have matched impedances.

5. A protection device as defined in claim 3 wherein said resistor comprises a plurality of resistor sections to disperse the heating of the thermostat.

6. A protection device as defined in claim 2 wherein said known temperature is in the range of 70° C.–90° C.

7. A protection device as defined in claim 6 wherein said resistor comprises a plurality of resistor sections to disperse the heating of the thermostat.

8. A protection device as defined in claim 2 wherein said resistor comprises a plurality of resistor sections to disperse the heating of the thermostat.

9. A protection device as defined in claim 2 wherein said power supply is a dual chopper.

10. A protection device as defined in claim 1 wherein said power supply has a split choke with a current output and two parallel coil sections with first and second current inputs in said first and second paths, respectively, said current inputs of said split choke being said generally identical points.

11. A protection device as defined in claim 10 wherein said parallel coil sections are matched impedances.

12. A protection device as defined in claim 11 wherein said known temperature is in the range of 70° C.–90° C.

13. A protection device as defined in claim 10 wherein said known temperature is in the range of 70° C.–90° C.

14. A protection device as defined in claim 10 wherein said power supply is a dual chopper.

15. A protection device as defined in claim 1 wherein said known temperature is in the range of 70° C.–90° C.

16. A protection device as defined in claim 15 wherein said resistor comprises a plurality of resistor sections to disperse the heating of the thermostat.

17. A protection device as defined in claim 1 wherein said resistor comprises a plurality of resistor sections to disperse the heating of the thermostat.

18. A protection device as defined in claim 1 wherein said power supply is a dual chopper.

19. A protection device for use on a dual stage power supply for passing current from first and second paths in unison across and electrode and a workpiece of an electric arc welder, said device includes a resistor connected between generally identical points in said first and second paths, whereby current flows through said resistor based upon the difference in the voltage of said points, a thermostat mounted adjacent said resistor, said thermostat having a known temperature at which said thermostat is tripped into an overheat state, and a circuit to provide a signal when said thermostat is tripped.

20. A protection device as defined in claim 19 wherein said device includes a circuit for disabling said power supply upon creation of said signal.

21. A protection device as defined in claim 20 wherein said power supply has a split choke with a current output and two parallel coil sections with first and second current inputs in said first and second paths, respectively, said current inputs of said split choke being said generally identical points.

22. A protection device as defined in claim 21 wherein said parallel coil sections have matched impedances.

23. A protection device as defined in claim 19 wherein said power supply has a split choke with a current output and two parallel coil sections with first and second current inputs in said first and second paths, respectively, said current inputs of said split choke being said generally identical points.

24. A protection device as defined in claim 23 wherein said parallel coil sections have matched impedances.

25. A protection device as defined in claim 19 wherein said power supply is a dual chopper.

26. A protection device as defined in claim 19 wherein said resistor and thermostat are mounted together as a unit.

27. A protection device as defined in claim 26 including an element carrying said unit with said unit spaced away from said points being monitored.

28. A protection device as defined in claim 26 wherein said unit is potted to insulate it from the surrounding environment.

* * * * *